United States Patent
Hovsto et al.

(12) 
(10) Patent No.: US 6,186,317 B1
(45) Date of Patent: Feb. 13, 2001

(54) BELT STEERING ASSEMBLY FOR CENTERING OF CONVEYOR BELTS

(75) Inventors: Kenneth Hovsto, Heistad; Kjell Arne Gaarden, Heroya, both of (NO)

(73) Assignee: A/S Techno Track, Skien (NO)

( * ) Notice: Under 35 U.S.C. 154(b), the term of this patent shall be extended for 0 days.

(21) Appl. No.: 09/194,592

(22) PCT Filed: May 28, 1997

(86) PCT No.: PCT/NO97/00134

§ 371 Date: Dec. 28, 1998

§ 102(e) Date: Dec. 28, 1998

(87) PCT Pub. No.: WO97/45344

PCT Pub. Date: Dec. 4, 1997

(30) Foreign Application Priority Data

May 31, 1996 (NO) .................................... 962268

(51) Int. Cl.[7] ............................ B65G 23/44; B65G 23/00
(52) U.S. Cl. .................................................. 198/806
(58) Field of Search ................... 198/806, 840, 198/807

(56) References Cited

U.S. PATENT DOCUMENTS

| | | | | |
|---|---|---|---|---|
| 2,160,057 | * | 5/1939 | Carus et al. | 198/806 |
| 3,065,646 | * | 11/1962 | Vance | 198/806 |
| 3,066,547 | * | 12/1962 | Evans et al. | 198/806 |
| 3,303,924 | * | 2/1967 | Hartzell, Jr. | 198/806 |
| 3,306,431 | * | 2/1967 | Poundstone | 198/806 |
| 3,593,841 | * | 7/1971 | Leow | 198/806 |
| 4,506,782 | * | 3/1985 | Jeanneret et al. | 198/806 |
| 5,609,241 | * | 3/1997 | Shaw | 198/806 |

FOREIGN PATENT DOCUMENTS

| | | | |
|---|---|---|---|
| 344367 | 3/1960 | (CH) . | |
| 491800 | 7/1970 | (CH) . | |
| 3035-798 | * 4/1982 | (DE) | 198/806 |
| 2 110 382 | 6/1972 | (FR) . | |
| 2 117 781 | 7/1972 | (FR) . | |
| 178853 | 6/1996 | (NO) . | |
| 1555-239 | * 4/1990 | (SU) | 198/806 |

* cited by examiner

*Primary Examiner*—Douglas Hess
(74) *Attorney, Agent, or Firm*—Young & Thompson

(57) ABSTRACT

A reversible belt steering assembly for centering of conveyor belts which during operation is subjected to a lateral displacement away from a neutral position. A rotating mechanism (3, 19) supports at least one steering roller for the conveyor belt, and is rotatably attached to a first fixed beam (2) for rotation about an axis (a) perpendicular to the conveyor belt. A first set of guide rollers (9) abuts the sides of the conveyor belt, and is thus displaced laterally depending on the lateral displacement of the conveyor belt, and a first transfer mechanism supports the first set of guide rollers (9) for transferring the lateral displacement of the first set of guide rollers (9) to the rotating mechanism (3, 19), to rotate the steering roller to a position where it guides the conveyor belt back to the neutral position. There is a second set of guide rollers (9') corresponding to the first set of guide rollers, and a second transfer mechanism corresponding to the first transfer mechanism. The two sets of guide rollers (9, 9') and the two transfer mechanisms are arranged mutually opposite and inverted with respect to an intermediate axis of symmetry which is transverse to the longitudinal direction of the belt and extends through the axis (a) of the rotating mechanism. The reversible belt steering unit (1) also comprises a switch mechanism for disconnecting and connecting the first and second transfer mechanisms in relation to the rotating mechanism (3, 19).

10 Claims, 2 Drawing Sheets

BELT STEERING ASSEMBLY FOR CENTERING OF CONVEYOR BELTS

Figure 1:
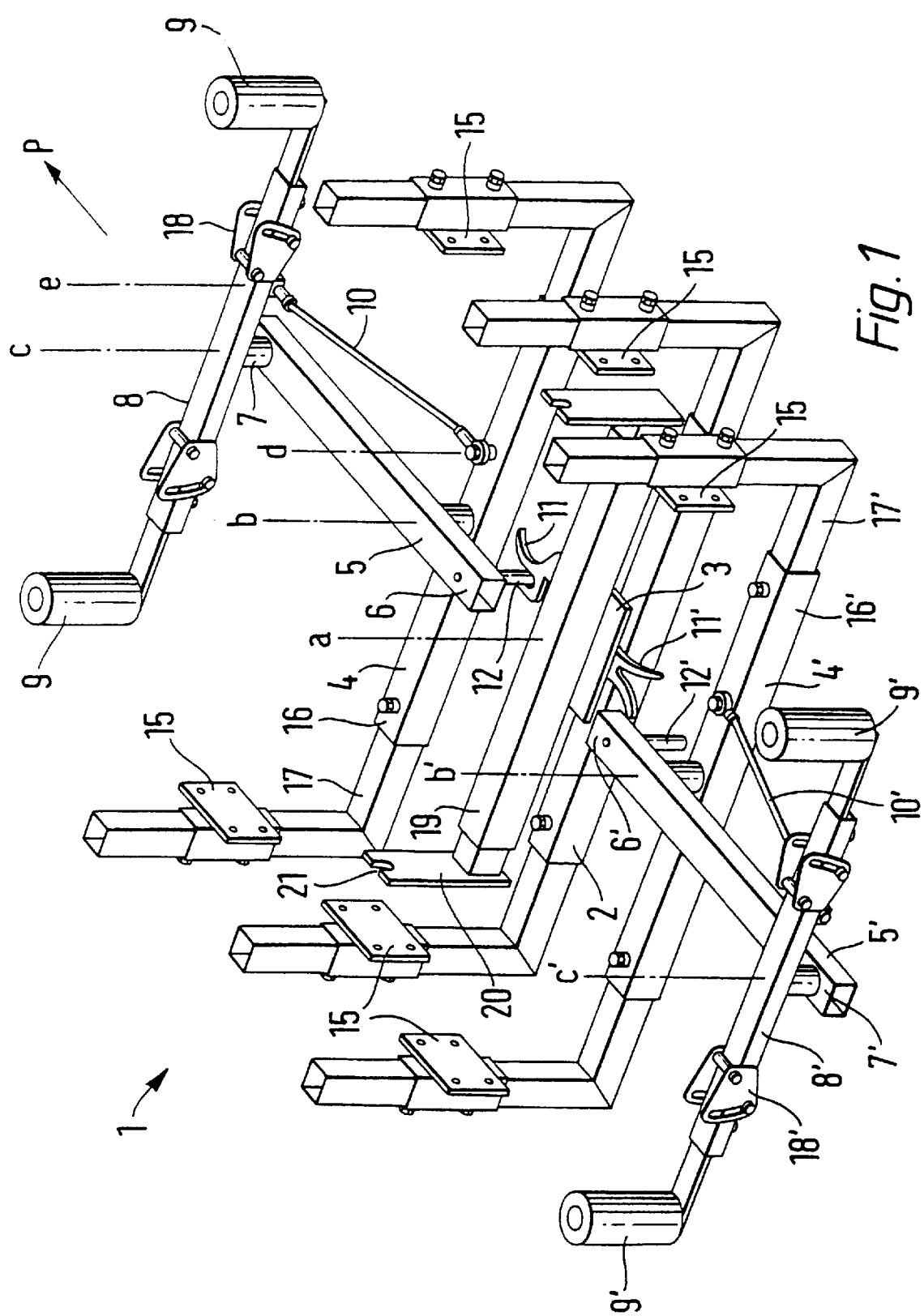

The invention concerns a reversible belt steering assembly for centring conveyor belts, comprising a rotating mechanism which is rotatable about an axis perpendicular to the conveyor belt and which supports at least one steering roller for the conveyor belt, and a first transfer mechanism which supports first guide rollers, wherein the guide rollers of the conveyor belt are guided laterally in relation to the conveyor belt's longitudinal direction, and where in the event of a lateral misalignment of the conveyor belt from a neutral position for the conveyor belt and the belt steering assembly the first transfer mechanism transfers the guide rollers' movement to the rotating mechanism for rotation of the steering rollers to a position in which they steer the conveyor belt back to the neutral position The belt steering assembly is used to guide the conveyor belt in processing plants for various types of materials such as granulated ores.

In DE 174491 there is disclosed a conveyor belt device for correcting lateral misalignments which occur during operation and thus return the belt to its normal position. A set of steering rollers for the conveyor belt is mounted on a plate which is rotatably attached to the base. On to the rotatable plate there is mounted an arm with a transverse stay. The arm may be jointed and rotatable about a rotating joint which is attached to the base. To the transverse stay there are attached guide rollers which run along the edge of the conveyor belt, and which in the event of a lateral misalignment of the belt transfer the displacement to the transverse stay. The displacement is transferred to the lever arm, which in turn transfers the displacement to the plate with the result that the axes of the steering rollers are tilted, thus returning the conveyor belt to its normal position.

In NO 178 853 there is disclosed a belt steering assembly of a similar type, but where the lever arm is rotatably attached both to the plate which holds the steering rollers and the transverse stay which holds the guide rollers. The lever arm is rotatably attached at a fixed point located at a distance from the rotating fastenings in the plate and the transverse stay, and a rotatable parallel stay is mounted parallel to the lever arm, between the transverse stay and a fixed base in the form of a beam, with the result that the transverse stay always remains standing at right angles to the conveyor belt's centre line.

Known belt steering assemblies of the type which is described in DE 174491 and similar types have a tendency to cause wandering and misalignment of the conveyor belt, especially when there is uneven loading or uneven weight distribution, thus causing wear along the edges of the belt.

In comparison with these other known belt steering assemblies the belt steering assembly which is disclosed in NO 178 853 provides a far smoother movement of the conveyor belt and consequently less wear and a longer working life. The belt steering assembly which is described in NO 178 853, however, only works when the belt is moving in one direction, which is not adequate for a number of purposes.

The object of the invention is to provide a belt steering assembly which can be used to steer a reversible conveyor belt in both directions of travel.

This object is achieved according to the invention with a belt steering assembly of the type mentioned in the introduction, characterized by the features which are indicated in the claims.

Thus the invention consists in a belt steering assembly comprising a rotating mechanism with at least one steering roller. Depending on the belt's direction of travel the rotating mechanism with the steering roller can be controlled by means of a switch mechanism by two different sets of guide rollers, with the result that the steering roller returns the belt to its neutral position.

In a preferred embodiment the transverse stay with the guide rollers is located perpendicular to the conveyor belt's longitudinal direction, and the transfer of movement from the guide rollers to the steering roller is implemented with the type of mechanism which is described in NO 178 853.

Figure 2:
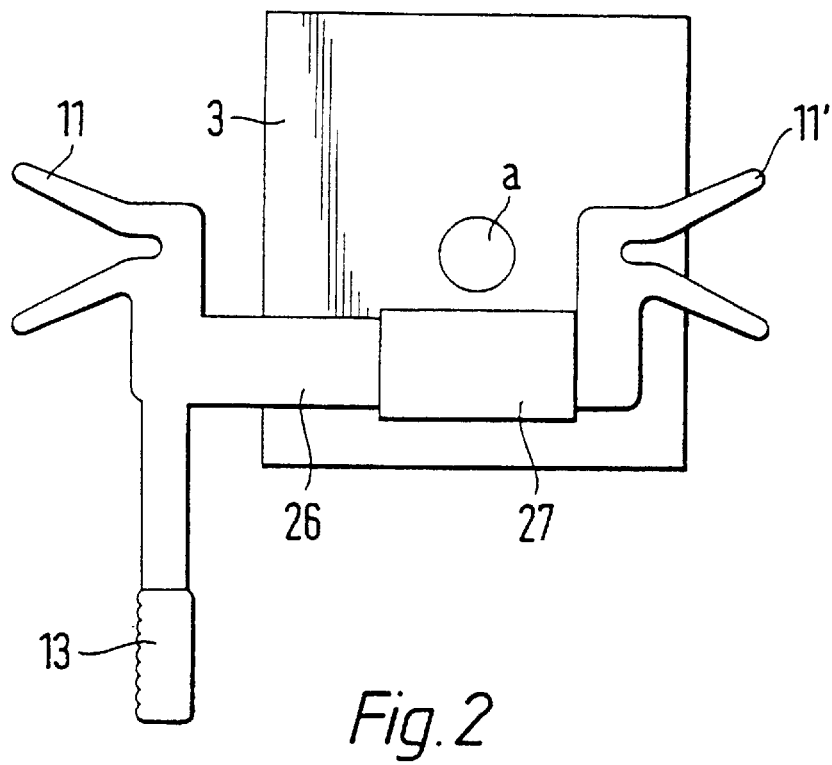
Figure 3:
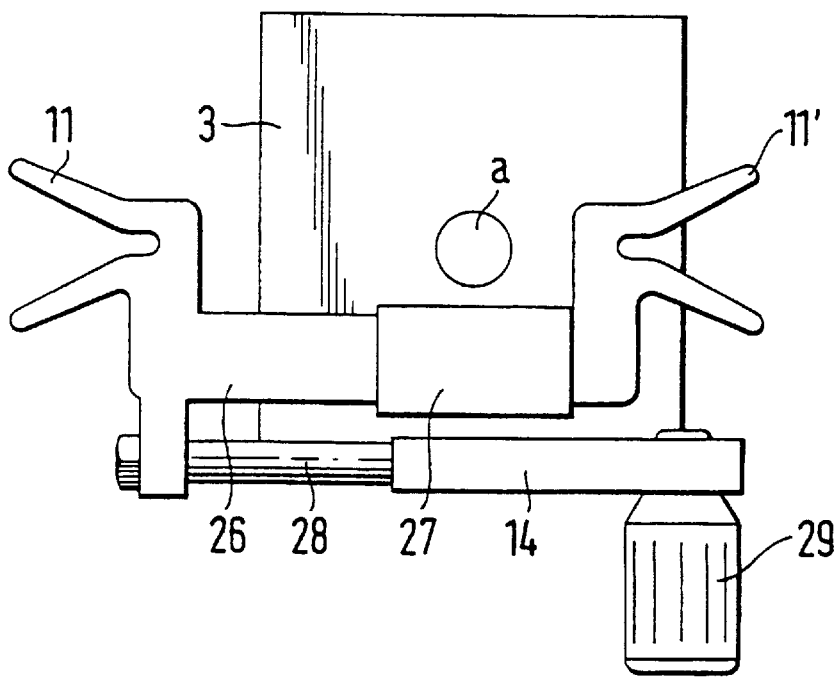

The invention will now be explained in more detail in connection with a description of a specific embodiment, and with reference to the drawing, in which:

FIG. 1 is a perspective view of a reversible belt steering assembly according to the invention, FIG. 2 illustrates a manual switch mechanism according to the invention, and FIG. 3 illustrates an automatic switch mechanism according to the invention The same reference numerals are employed for corresponding parts in all the figures.

FIG. 1 illustrates a reversible belt steering assembly 1, comprising a first beam 2, a second beam 4 and a third beam 4', all of which are attached to the side members or the frame of a conveyor with a conveyor belt. The actual conveyor with the conveyor belt is of a known type, and is not shown here in order to illustrate the actual invention more clearly, but it should be understood that the first, second and third beams are attached to the conveyor's side members with mounting brackets 15, and that these three beams are thereby firmly secured in relation to the base. Supporting rollers (not shown) attached crosswise between the side members support the conveyor belt, thus enabling it to move in its longitudinal direction, indicated by the arrow P.

A rotating mechanism in the form of a rotatable plate 3 is attached in the middle of the first beam 2 for rotation about an axis a. A beam 19 with brackets 20 is firmly secured to the rotatable plate 3, and the brackets 20 have grooves 21 for mounting a steering roller (not shown), thus enabling it to be rotated about the axis a in the same way as the rotatable plate.

A first lever arm 5 is attached in the middle of the second beam 4 for rotation about an axis b, and gripping members in the form of a pin 12 in a first end 6 of the first lever arm 5 and a fork 11 on the rotatable plate 3 can transfer movement from the first lever arm to the rotatable plate. The first lever arm 5 is further rotatably attached at a second end 7 to a first transverse stay 8, thus enabling it to rotate about an axis c. The first transverse stay 8 further has rotatably mounted first guide rollers 9 each of which abuts against its outer edge of the conveyor belt.

A first parallel stay 10 is provided parallel to the first lever arm 5, rotatably attached to the second beam 4 for rotation about an axis d, and rotatably attached to the first transverse stay 8 for rotation about an axis e. The distance b–d is equal to the distance c–e, and the distance b–c is equal to the distance d–e, with the result that the second beam 4, the first lever arm 5, the first transverse stay 8 and the first parallel stay 10 form a parallelogram. The first transverse stay 8 will therefore always be parallel to the second beam 4, i.e. perpendicular to the conveyor belt's longitudinal direction P.

The first transverse stay 8, the first parallel stay 10 and the first lever arm 5 with the pin 12 thereby form a transfer mechanism for transferring movement from the first guide rollers 9 to the rotatable plate 3, since a lateral displacement of the conveyor belt across its longitudinal direction P will be transferred to the first guide roller 9, via the first transverse stay 8 to the first lever arm 5, and on through the pin 12 and the fork 11 to the rotatable plate 3, thus causing it to be rotated about the axis a. The steering roller mounted in the brackets 20 on the beam 19 which is firmly secured in the rotatable plate 3 will thereby by tilted and exert a laterally directed force on the belt, thus returning the belt to the position it occupied before it began its lateral displacement.

A second transfer mechanism, comprising a second lever arm 5' rotatably secured in the third beam 4', a second transverse stay 8' and a second parallel stay 10' for transferring movement from second guide rollers 9' to the rotatable plate 3 is arranged opposite to the steering roller and corresponding to the first lever arm 5, the second beam 4, the first transverse stay 8 and the first parallel stay 10, with the result that the second transfer mechanism in the illustrated embodiment is an inversion of the first transfer mechanism. The second transfer mechanism is indicated in FIG. 1 with the same reference numerals as the first transfer mechanism, with the addition of a mark (4', 5', etc.) and the second transfer mechanism will therefore not be described in detail.

The first, second and third beams, the transverse stays and the beam for the steering roller are laterally adjustable by means of telescopically movable external square tubes 16 and internal square tubes 17, thus enabling the belt steering assembly to be adjusted in order to guide the conveyor belt towards a desired neutral position. In addition the transverse stays have settings 18 for adjusting the angle of contact of the guide rollers towards the edges of the conveyor belt.

When the conveyor belt is moved in the direction indicated by the arrow P the rotatable plate 3 is controlled by the first transfer mechanism as shown in FIG. 1.

When the conveyor belt is reversed so that its direction of travel is opposite the direction of the arrow P, the first transfer mechanism is disconnected and the second transfer mechanism is connected by engagement with the rotatable plate 3 by means of a switch mechanism, the fork 11 being brought out of engagement with the pin 12 and the fork 11' being brought into engagement with the pin 12'.

FIG. 2 illustrates an embodiment of the switch mechanism, in which the forks 11, 11' are connected with each other by means of a fork stay 26. The fork stay is passed through and guided laterally by a guide bushing 27, and can be moved manually in its longitudinal direction with a handle 13, thus causing the forks to be moved in and out of engagement with the pins. By means of the fork stay an embodiment of the switch mechanism is obtained in which the rotatable plate can only be connected to one transfer mechanism at a time, since one fork will be withdrawn from engagement at the same time as the other fork is moved into engagement with its respective pin.

FIG. 3 illustrates an electrically driven switch mechanism where the fork stay 26 is moved by an actuator 14 in the form of a rack 28 driven by an electric motor 29.

The electric motor can be controlled manually, or it can be controlled by a signal which indicates the conveyor belt's direction of travel.

The illustrated embodiment of the conveyor belt steering device is a so-called "understeerer", i.e. it is designed to steer the conveyor belt when it moves in a return direction on the underside of the conveyor. Correspondingly, an "oversteerer" is employed to steer the conveyor belt when it moves in a direction of travel on the top of the conveyor. In principle the oversteerer will be similar to the understeerer, but the design will be slightly different on account of the attachment to the conveyor's side members.

The invention has been explained in the above with reference to a specific embodiment. It has been shown here how the specified object is achieved, with the provision of a belt steering assembly which is capable of steering a reversible conveyor belt in both directions of travel.

The illustrated embodiment of the transfer mechanism, where the second beam 4, the first lever arm 5, the first transverse 8 and the first parallel stay 10 form a parallelogram, is a preferred embodiment of the invention, since it is demonstrated, as described in NO 178 853, that this is favourable for the belt's stability and counteracts a tendency to misalignments. This transfer mechanism can of course be designed in other ways in other embodiments, for example by moving the parallel stay's rotatable mountings in such a manner that this part of the mechanism no longer forms an exact parallelogram. Another, simpler version of the transfer mechanism can consist in rigidly connecting the first lever arm 5 and the first transverse stay 8 with each other and omitting the first parallel stay 10.

Another variation can be produced by a different design of the two transfer mechanisms, since there is, of course, no requirement for them to be alike. This may be relevant if the conveyor belt is normally moved in one specific direction, and it is only in exceptional cases or when there is light loading that the belt goes in the other direction.

Other variations may be associated with the design of the gripping members and the switch mechanism, or the mounting of the steering rollers. These and similar variations of the invention can be implemented by a person skilled in the art without deviating from the invention as it is defined in the claims.

What is claimed is:

1. A reversible belt steering assembly (1) for centering of conveyor belts which during operation is subjected to a lateral displacement away from a neutral position, comprising:

a rotating mechanism (3, 19) which supports at least one steering roller for the conveyor belt, and which is rotatably attached to a first fixed beam (2) for rotation about an axis (a) perpendicular to the conveyor belt, a first set of guide rollers (9) for abutting the sides of the conveyor belt, and which is thus displaced laterally depending on the lateral displacement of the conveyor belt, and a first transfer mechanism supporting the first set of guide rollers (9) for transferring the lateral displacement of the first set of guide rollers (9) to the rotating mechanism (3, 19), to rotate the steering roller to a position where it guides the conveyor belt back to the neutral position, characterized in that the reversible belt steering assembly (1) comprises a second set of guide rollers (9') corresponding to the first set of guide roller, and a second transfer mechanism corresponding to the first transfer mechanism, that the two sets of guide rollers (9,9') and the two transfer mechanisms are arranged mutually opposite and inverted with respect to an intermediate axis of symmetry which is transverse to the longitudinal direction of the belt and extends through the axis (a) of the rotating mechanism, and that the reversible belt steering unit (1) also comprises a switch mechanism for disconnecting and connecting the first and second transfer mechanisms in relation to the rotating mechanism (3, 19).

2. A reversible belt steering assembly (1) according to claim 1, characterized in that the first and second transfer mechanisms comprise a respective first and respective second lever arm (5, 5') extending essentially in the longitudinal direction (P) of a conveyor belt, that the first and second lever arm (5, 5') are rotatably attached to a respective second and third fixed beam (4, 4') extending transverse to the longitudinal direction (P) of the conveyor belt, the rotatable attachment being arranged about an axis (b, b') perpendicular to the conveyor belt, that the first and second lever arm (5, 5') in first ends (6, 6') facing the rotating mechanism (3, 19) are provided with gripping members (12, 12') for engagement with corresponding gripping members (11, 11') of the rotating mechanism (3, 19), that the first and second lever arm (5, 5') in second ends (7, 7') facing away from the rotating mechanism (3, 19) are rotatably attached to a respective first and second transverse stay (8, 8') supporting the first and second set of guide rollers (9, 9'), the rotatable attachment being arranged about an axis (c, c') perpendicular to the conveyor belt, and that a first and second parallel stay (10, 10') which is parallel or essentially parallel to the first and second lever arm (5, 5') extends between the second and third fixed beam (4, 4') and the first and second transverse stay (8, 8').

3. A reversible belt steering assembly according to claim 2, characterized in that the switch mechanism is achieved by the gripping members (11, 11') of the rotating mechanism being securely interconnected and movable between a position in which the gripping member (12) of the first lever arm is in engagement with the corresponding gripping member (11) of the rotating mechanism while the gripping member (12') of the second lever arm is out of engagement with the rotating mechanism, and an opposite position.

4. A reversible belt steering assembly according to claim 2, characterized in that the gripping members (12, 12') of the lever arms consist of pins, and that the gripping members (11, 11') of the rotating mechanism consist of forks.

5. A reversible belt steering assembly according to claim 1, characterized in that the switch mechanism comprises a handle (13) for manual switching.

6. A reversible belt steering assembly according to claim 1, characterized in that the switch mechanism comprises an electrically driven actuator (14) for automatic switching.

7. A reversible belt steering assembly according to claim 6, characterized in that the electrically driven actuator (14) is controlled by a signal which reflects the belt's direction of travel.

8. A reversible belt steering assembly according to claim 1, characterized in that the belt steering assembly is laterally adjustable in relation to the belt's longitudinal direction (P).

9. A reversible belt steering assembly according to claim 8, characterized in that the first, second and third fixed beams (2, 4, 4') are laterally adjustably attached to a fixed frame in order to be able to adjust the belt steering assembly laterally.

10. A reversible belt steering assembly according to claim 9, characterized in that the laterally adjustable attachment is performed with telescopic, mutually movable rail or tubes, preferably square tubes (16, 17).

* * * * *